United States Patent [19]

Huin et al.

[11] 4,218,338
[45] Aug. 19, 1980

[54] PROCESS FOR RECYCLING GASEOUS REACTANTS USED FOR REGENERATING A HYDROCARBON HYDROCONVERSION CATALYST

[75] Inventors: Roland Huin, Montesson La Borde; Jean-Claude Barbier, La Celle St. Cloud, both of France

[73] Assignee: Institut Francais du Petrole, Rueil-Malmaison, France

[21] Appl. No.: 917,224

[22] Filed: Jun. 20, 1978

[30] Foreign Application Priority Data

Jun. 20, 1977 [FR] France .................................. 77 19059

[51] Int. Cl.$^2$ ........................ B01J 23/96; B01J 21/20; C10G 35/08; C10G 35/12
[52] U.S. Cl. .................................... 252/415; 208/140; 252/418; 422/190; 422/213; 422/216; 423/241
[58] Field of Search .................. 252/415, 418; 208/47, 208/139, 140; 423/241; 55/71; 422/190; 23/288 B, 288 G, 284

[56] References Cited

U.S. PATENT DOCUMENTS

| | | | |
|---|---|---|---|
| 2,617,713 | 11/1952 | Ayers et al. | 208/47 |
| 2,905,626 | 9/1959 | Sutherland | 208/139 |
| 2,952,611 | 9/1960 | Haxton et al. | 208/139 |
| 3,172,832 | 3/1965 | Dreyer et al. | 208/47 |
| 4,133,743 | 1/1979 | Boret et al. | 252/415 |

FOREIGN PATENT DOCUMENTS 917367 2/1963 United Kingdom .................... 208/140

*Primary Examiner*—P. E. Konopka
*Attorney, Agent, or Firm*—Millen & White

[57] ABSTRACT

A hydrocarbon hydroconversion catalyst is regenerated by (a) combustion, (b) chlorination or oxychlorination and (c) treatment with an oxygen-containing gas, and the gas discharged from the regeneration zone, before re-use, is (a) cooled down to below 70° C., (b) subjected to double washing and (c) dried to reduce the water content of the gas to less than 2,500 ppm. An apparatus is also disclosed, certain parts of which are made of a material strongly resistant chlorine and other parts of a less resistant material with respect thereto.

11 Claims, 1 Drawing Figure

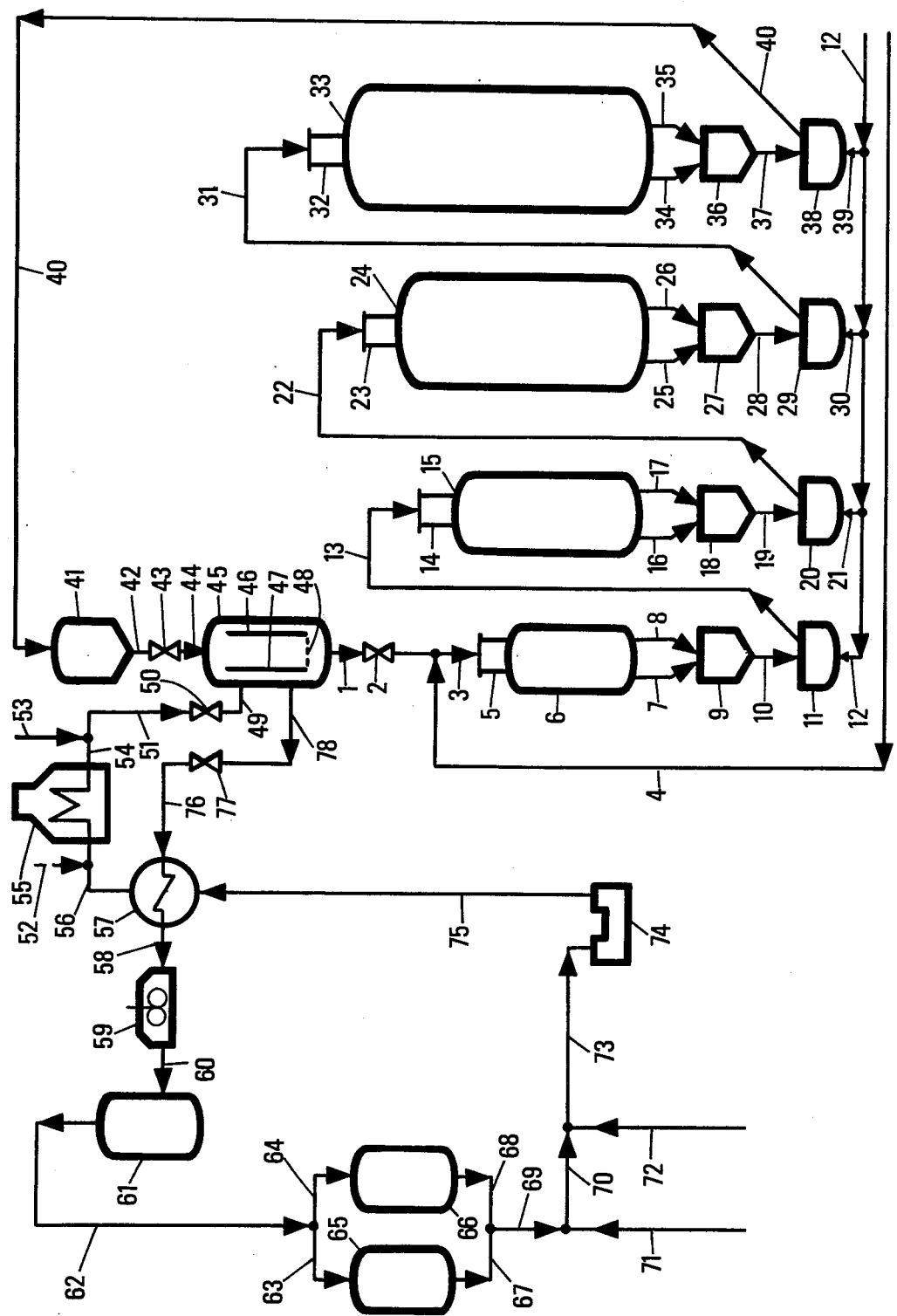

PROCESS FOR RECYCLING GASEOUS REACTANTS USED FOR REGENERATING A HYDROCARBON HYDROCONVERSION CATALYST

This invention relates to a process for regenerating a catalyst comprising a carrier, at least one metal of the periodic classification of the elements and halogen in an amount of, for example, 0.1 to 10% by weight. This invention thus relates to the regeneration of a catalyst utilized for converting hydrocarbons, particularly a catalyst for hydroreforming hydrocarbons, or a catalyst for producing aromatic hydrocarbons, for example for producing benzene, toluene and xylenes (ortho, meta or para), either from saturated or unsaturated gasolines (for example, from pyrolysis, cracking, particularly steam-cracking, or catalytic reforming gasolines), or from naphthenic hydrocarbons convertible to aromatic hydrocarbons by dehydrogenation.

The invention also relates to the regeneration of a catalyst for the dehydrogenation of saturated, naphthenic or paraffinic hydrocarbons, for the isomerisation of alkylaromatic compounds or, for example, for alkylating hydrocarbons or for hydrocracking hydrocarbons.

The general conditions of the hydroreforming or catalytic hydroreforming reactions are the following: the average temperature of the reactor or the reaction zone is between about 480° and 600° C., the pressure between about 5 and 20 kg/cm$^2$, the hourly velocity between 0.5 and 10 volumes of liquid naphtha per volume of catalyst and the recycle rate between 1 and 10 moles of hydrogen per mole of feed charge. The feed charge may be a naphtha distilling between about 60° and about 220° C., particularly a straight-run naphtha; the catalyst comprises, for example, at least one noble metal of the platinum family, i.e. a noble metal such as platinum, palladium, iridium, ruthenium, osmium, on an alumina carrier, or an equivalent compound. The total noble metal content is from 0.1 to 2% b.w. of the catalyst and the halogen, preferably chlorine, content from 0.1 to 10%. Other types of carrier are, for example, alumina-silica, magnesia-silica, thoria-silica, magnesia-alumina, and the like.

The catalyst may also comprise at least one other metal promoter selected from various groups of the periodic classification of the elements.

The general conditions of the reactions for producing aromatic hydrocarbons from saturated or unsaturated gasolines (a process of the "aromizing" type or of a similar type) are the following: when the charge is unsaturated, i.e. it contains diolefins and monoolefins, it must first be made free of them by selective or total hydrogenation. Then, after optional removal by hydrogenation of substantially all diolefins and monoolefins, if any, the charge is subjected, in each reaction zone, to a hydrogen treatment, in the presence of a catalyst comprising a carrier, 0.1 to 10% b.w. of chlorine (i.e. calculated as chlorine element) and at least one noble metal of the VIII$^{th}$ (group/platinum group), optionally also at least one other metal promoter selected from the periodic classification of the elements; the content of metal of the platinum family is usually between 0.005 and 5% by weight. The carrier is selected from aluminas and oxychlorinated and/or fluorinated aluminas, or other similar compounds among which alumina-silica, magnesia-silica, thoria-silica, magnesia-alumina, and the like may be mentioned. The reaction is conducted at a temperature between about 530° and 600° C., under a pressure between 1 and 60 kg/cm$^2$, at an hourly volume rate of liquid charge of about 0.1 to 10 times the volume of catalyst and at a molar hydrogen: hydrocarbon ratio of about 0.5 to 20.

The general conditions of the dehydrogenation reactions, as concerns the saturated naphthenic and paraffinic hydrocarbons with 3 to 40 carbon atoms per molecule, are the following: These reactions are performed in the presence of catalysts of the same type as those used for reforming, at a temperature usually in the range of from 300° to 600° C., under a pressure of from 0.1 to 30 volumes of liquid charge per volume of catalyst. The molar hydrogen/hydrocarbons ratio at the inlet of the reactor is usally between 0.1 and 30.

The reactions for isomerizing alkyl-aromatic compounds, particularly C$_8$ alkyl-aromatic hydrocarbons (i.e. xylenes, ethylbenzene and mixtures thereof whose compositions differ from the thermodynamic equilibrium, especially the mixtures where the para-xylene content is lower than the content at equilibrium) are the following:

The catalyst comprises, in addition to the conventional carrier and halogen, at least one metal element having hydrogenation-dehydrogenation properties, so that the catalyst is able to convert ethyl-benzene and fouling of the catalyst is reduced, said fouling being due to the formation and deposit on the solid material of heavy products from a possible parasitic polymerization. The metal element(s) with hydrogenation-dehydrogenation properties are particularly selected from the group VIII noble metals, i.e. noble metals of the platinum family with optional addition of metals of group VI-A or derivatives thereof (periodic classification of the elements), such as chromium, molybdenum or tungsten. The amount of metal element or of each of the metal elements, when several are present, is usually between 0.005 and 1% b.w. of the catalyst. The reaction is conducted at a temperature of about 350° to 500° C., a pressure of about 5 to 30 bars, a space velocity of about 0.5 to 10 volumes of liquid charge per volume of catalyst per hour, and a hydrogen/hydrocarbon ratio of about 2 to 10 by mole.

The catalyst to be regenerated, which thus usually comprises 0.005 to 5% of at least one noble metal of the platinum family and 0.1 to 10% of chlorine is discharged either from a container where it has accumulated before regeneration thereof or directly from a reactor where the reaction has taken place; this catalyst, for example a granular catalyst, may be present, for example, as spherical balls of diameter usually between 1 and 3 mm, preferably between 1.5 and 2 mm, although these values are not limitative. The bulk density of the catalyst is usually between 0.4 and 1, preferably between 0.5 and 0.9, particularly between 0.55 and 0.8, these values not limiting however the scope of the invention.

The regeneration of the catalyst is effected in an enclosure where the catalyst is treated in the form of a fixed or moving bed. In that enclosure the catalyst is successively, for example, (a) subjected to combustion with a gas comprising molecular oxygen;

(b) subjected to chlorination or to simultaneous oxychlorination by means of a gas comprising molecular oxygen and halogen (for example chlorine) or a halogen compound, for example a halogenated hydro-acid or an alkyl halide, or a mixture of halogen and halogenated compound;

(c) subjected to a final treatment with a gas of high molecular oxygen content.

The regeneration may be performed in two manners: either by operating in a regeneration zone where the catalyst to be regenerated is circulated as a moving bed. As the catalyst drops inside of the regeneration zone, it traverses successively three distinct zones corresponding to each of the three steps (a), (b), (c), of the regeneration process.

or by operating in a regeneration zone where the catalyst to be regenerated is arranged as a fixed bed. The fixed bed catalyst is then regenerated in three successive steps (a), (b) and (c).

The detailed conditions of the regeneration process are the following:

(a) The first step concerns the combustion of the coke deposits. This operation is effected by oxygen injection into an inert mixture, this inert mixture being used as thermal diluent. Air (containing about 20% oxygen) diluted with an inert gas could be used. However air is not sufficiently pure and there is thus used, as inert mixture, for example, nitrogen and/or carbon dioxide gas; nitrogen is preferably used. The oxygen content of the injected inert mixture (or regeneration gas) is preferably 0.01 to 1% by volume. Any injected oxygen is consumed by combusting coke deposits, and completion of the combustion is easily detected as the oxygen content of the gas discharged from the regenerator increases and the flame front (horizontal plane of combustion) disappears, said flame front propagating downwardly in the catalyst bed. Combustion takes place at an average temperature preferably comprised between 350° and 550° C. under a pressure of, for example, 1 to 15 kg/cm².

The combustion temperature is so regulated as to depend on the oxygen concentration; the gas temperature at the inlet of the regenerator and the gas velocity are so regulated as to maintain a temperature, at the level of the flame front, lower than the sintering temperature, usually lower than 700° C., preferably about 450° C. This gas is passed for a sufficient time to eliminate coke from the catalyst. Practically all the coke may be eliminated in this manner.

As a rule, the amount of coke on the catalyst may be decreased to about 0.5% b.w. in 4 hours of regeneration and to a value below 0.1% in 6 hours. (b) The second step concerns the chlorination or oxychlorination of the catalyst; oxychlorination may be effected by increasing the oxygen content of the regeneration gas fed to the regenerator up to a value between 1 and 3% by volume, while simultaneously feeding a chlorine-containing compound, i.e. chlorine itself, hydrochloric acid or an alkyl or cycloalkylchloride comprising 1 to 6 carbon atoms per molecule, for example chloroform, tertiary butyl chloride, cyclohexyl chloride, isopropyl chloride, dischlorodifluoromethane, or preferably carbon tetrachloride; the alkyl chloride proportion is such that this alkyl halide may from 0.5 to 1.2% b.w. of an aluminum chloride compound with respect to the catalyst subjected to regeneration. Mixtures of halogen compounds, for example a mixture of chlorine and hydrochloric acid, or a mixture of carbon tetrachloride and hydrochloric acid, the latter mixture comprising by weight, about 5–60% hydrochloric acid and 95–40% carbon tetrachloride. Other halogen compounds may be used, for example such compounds as thionyl chloride or nitrosyl chloride, ammonium chloride, halogenated organic acids such as monochloracetic acid and trichloracetic acid, or any equivalent compound.

Chlorination or oxychlorination is effected at an average temperature of from 350° to 550° C. under a pressure of about 1 to 15 kg/cm². This treatment may take, for example, from 20 minutes to 3 hours, usually about 1 hour.

(c) The third final step of regeneration relates to catalyst oxidation: it is conducted by increasing the oxygen content of the regeneration gas admitted to the regenerator up to a value of from 3 to 20% by volume, and the regenerator is then maintained at an average temperature between 350° and 550° C. and an average pressure between 1 and 15 kg/cm². This operation takes, for example, from 30 minutes to 6 hours and preferably from 40 minutes to 2 hours. It is usually about 2 hours.

After the third step, the catalyst is usually purged with nitrogen, then placed, for example, under hydrogen equilibrated in pressure with the reaction zone where the catalyst is to be injected. The catalyst is then stored or immediately passed from the regenerator to a reactor through an adequate valve system. Before being supplied to a reactor, or at the inlet of a reactor, the catalyst is however usually first treated with a hydrogen stream at a temperature of, for example, 300° to 550° C., at a pressure of, for example, 3 to 25 kg/cm², preferably 5 to 20 kg/cm² (sulfurization of the catalyst, when required, may be effected in that space or at the top of the reactor or in the various ducts for transferring the catalyst to the top of this reactor).

The various gas compounds discharged from the regeneration zone during the regeneration steps are recovered and treated for a new recycling to the regeneration zone. It is economically unacceptable not to re-use these gases. As discussed above, oxygen was diluted essentially with nitrogen, which is a very expensive gas. In a reforming or aromizing unit operated with 40 metric tons of catalyst, the regeneration of these 40 metric tons of catalyst would require, in case of no-reutilization of the regeneration gas, from 6,000 to 10,000 normal cubic meters nitrogen per hour (normal means that the nitrogen volume is measured at normal pressure and temperature conditions). However recycling the regeneration gas requires only 80 normal cubic meters fresh nitrogen hourly.

The various gas compounds discharged from the regeneration zone are hot when discharged; they also contain chlorine since chlorine or a chlorine compound has been periodically supplied to the regenerator. According to the prior art, there was essentially used a loop operated at high temperature, with appropriate treatment of the gas compounds discharged from the regenerator. Such a circuit is not concerned with chlorine corrosion problems, since ducts and auxiliary equipment may be made of inconel or superficially treated with inconel or equivalent material. Inconel is an alloy known for its resistance to hot chlorine; this conventionl alloy comprises nickel (about 76% by weight), chronium (about 15% and iron (about 9%).

Inconel has, however, the disadvantage of being a very expensive alloy.

It has now been found that it was preferable, during the regeneration of the catalyst, to subject the latter to dry combustion and/or chlorination. This requires thoroughly drying the gas products discharged from the regenerator, for example to a water content lower than 2,500 ppm (parts per million) by weight, and if possible lower than 1,000 or better 100 ppm water, before reintroducing them to the regenerator. Thorough drying of these gaseous materials cannot be effected easily, when operating at high temperature, according to the prior art. It is thus necessary to operate at low temperature, and there must therefore be a cold portion in the recycle loop for the gas products discharged from the regeneration zone. This has a major disadvantage: inconel, which suffers no damage from hot chlorine, has a poor resistance to chlorine when cold, and no metal or metal alloy is known to resist satisfactorily to cold chlorine for more than one year. It could be made possible to utilize certain plastic coatings; however this would give rise to delicate problems, particularly at the junction points between the diverse ducts or equipments of the circuit. Now, with the object of having a cold portion in the recycle loop to permit ideal drying of the regeneration gas, the process has been improved in such a manner as to eliminate chlorine before the drying step. Finally, the apparent problem of the poor resistance of inconel to cold chlorine is obviated since the very expensive inconel may be substituted with a less expensive material for (example, carbon steel as shown hereinafter). The process of the invention thus permits first to avoid the use of inconel in the cold portion of the recyle circuit for the gas products discharged from the regeneration, then to correctly dry these gas products at low temperature, and finally to permit the utilization of stainless steel instead of inconel in the hot portion. Cold drying of the regeneration gas is intended to mean drying at a temperature lower than 70° C., preferably lower than 60° C. or, better, lower than 45° C., since the lower the cooling temperature, the lower the water content of the gas. The gas is dried in conventional fashion, either on molecular sieve at a temperature lower than about 70° or 60° C., or on activated alumina at a temperature lower than about 45° or 40° C., or alternately on silica gel at a temperature lower than about 50° C.

The drawing illustrates the process of the invention; this figure shows, by way of illustration, four Aromizing reactors of the mobile bed type. The figure has been simplified by not showing the charge supplied to the first reactor 6 and the path of the reaction effluents from reactor to reactor. The catalyst is fed through duct 1, valve(s) 2 and duct 3 into zone 5 where the catalyst accumulates (said zone 5 being fed with hydrogen through duct 4). The catalyst is fed to the first reactor 6 and discharged through ducts 7 and 8; it passes through zone 9 for feed rate control, then through duct 10 and attains the lift pot 11 wherefrom it is carried into lift 13 by means of a carrier gas supplied from duct 12 towards the reception zone 14 and the second reactor 15. The catalyst is discharged from reactor 15 through ducts 16 and 17, zone 18 and duct 19; it is supplied to lift pot 20 wherefrom it is carried into lift 22 with a carrier gas supplied from duct 21, towards zone 23 and the third reactor 24. The catalyst is discharged from reactor 24 through ducts 25 and 26; it passes through zone 27 and enters lift pot 29 through duct 28. By means of a carrier gas supplied through duct 30, the catalyst is passed through lift 31 and attains the accumulation zone 32 wherefrom it drops into the fourth reactor 33. The used catalyst is conveyed through ducts 34 and 35 to the feed control zone 36, then it is passed through duct 37 to the lift pot 38. A carrier gas is fed through duct 39; it carries the catalyst into lift 40 towards the storage zone 41 wherefrom it is supplied through ducts 42 and 44 and valve(s) 43 to the regeneration zone 45. According to the figure, the catalyst is regenerated in fixed bed, inside a cylinder represented on the figure by lines 46 and 47, the catalyst being maintained in cylinder 46–47 by the grid 48.

Oxygen is supplied through duct 71, nitrogen through duct 72 and chlorine or a chlorine compound through duct 53 (or 52). Between the regeneration zone 45 and the first catalytic zone 5, the regenerated catalyst may be subjected to a reduction step or to a treatment with hydrogen and to a sulfiding step. These steps are not shown in the figure.

The gas products, which periodically contain chlorine, are discharged from the regeneration zone 45 through duct 78, valve 77 and duct 76. These products, according to the invention, i.e. before cold treatment, are cooled in exchanger 57; they are passed through duct 58 and the optional air-cooler 59, then through ducts 60, 62, 63 and 64, and fed to a conventional cold-dryer such as 65 and/or 66. They are then passed through ducts 67, 68, 69, 70 and 73, through compressor 74 and duct 75, and are fed to exchanger 57, while oxygen and/or nitrogen are supplied, at the desired moment, through ducts 71 and 72. The gas products are fed through duct 56 to furnace 55, and then again to the regeneration zone 45 through ducts 54, 51, valve 50 and duct 49, with injection, at the requisite moment, of halogen or a halide compound through duct 53 (or through duct 52, if heating of the halogen or halogen compound in the furnace 55 is preferred). The invention is so characterized that a 2-zone washing device or enclosure 61 is arranged on the path of the gas compounds, before the drying zone such as 65 or 66, but after the cooler 57. The first washing zone consists of a conventional washing device, for example a column for bubbling the gas to be purified in the wash solution. Washing it here characterized by using an aqueous solution containing, with respect to water (substantially pure water as hereinafter defined), 1 to 10% by weight of sodium hydroxide or potassium hydroxide or an equivalent compound, for example an inorganic compound such as, for example, a carbonate or better, 2.5 to 6%, particularly 4 to 5% b.w. of sodium or potassium hydroxide, preferably sodium hydroxide, or an equivalent inorganic compound. Sodium and potassium hydroxide are preferred, and above all, sodium hydroxide. The solution advantageously also comprises, to avoid, in particular, foam formation and to improve the washing of gaseous chlorine, 0.01 to 0.45% b.w. of at least one thiosulfate (0.45% being the maximal weight of the thiosulfate or thiosulfates when several are present), particularly 0.05 to 0.03% b.w. of thiosulfate or thiosulfates, when several are present. Contents higher than 0.45% b.w. thiosulfates are detrimental to the process of the invention. The so-washed gases contain sodium or potassium hydroxide or any equivalent compound utilized during the washing, as traces, instead of halogen contained in the gas at the inlet of the washing zone 61. The washing device or enclosure 61 comprises a second wash column, also consisting of a conventional device, such as a plate column, where the gas to be purified is washed with substantially pure water. Substantially pure water is intended to mean industrial water, whether containing calcium or not. However in view of avoiding clogging of the ducts, there if preferably used demineralized water, or "boiler water" which gives substantially no solid deposit by evaporation.

The so-purified gas is water-saturated, which has no disadvantage in the process of the invention since this gas must in any case pass through a drying zone. It is sufficient to utilize conventional drying zones, such as 65 or 66.

The process of the invention, in addition to simplicity and efficiency, has further valuable advantages: since chlorine has been eliminated in the wash enclosure 61, it is no longer necessary to utilize inconel (an expensive alloy), as according to the prior art, as material for ducts 62, 63 and 64, dryers 65 and 66, ducts 67, 68, 69, 70 and 73, compressor 74 and duct 75. Weakly alloyed materials are sufficient, for example, carbon steel. Ducts 56 and 54 and oven 55 need no longer to be made of inconel since the gas supplied thereto is chlorine-free. In the process of the invention, only hot ducts 78 and 76, valves 77 and 50, hot ducts 51 and 49 and regeneration zone 45 are made of inconel.

It has also been observed that, when operating according to the invention, steels of the stainless type were sufficient for all the lines and valves 78, 76, 77, 50, 51 and 49 since the halogen compound is dry in these lines and valves.

Since halogen or a halogen compound is periodically injected into the regeneration zone 45 at high temperature, it is desired to use as material for this regeneration zone inconel or a similar material in order to avoid any corrosion in this zone.

This zone is usually made of such materials as, for example, a chromium alloy (for example, stainless steel). An apparatus thus made of massive chromium alloy will resist a long time to the periodic supply of chlorine or halogen compound. However, particles (for example, iron particles) eroded by corrosion from the internal walls of the reactor pollute the catalyst. Again, if ducts 51 and 49 are made of chromium alloy and not of inconel or a similar substance, the iron particles eroded by corrosion from these ducts also pollute the catalyst circulated through the regeneration zone.

The problem of pollution of the catalyst is also present in the regeneration zone 45. A further improvement obviates this disadvantage, so that it is unnecessary to use expensive inconel for manufacturing the whole regeneration zone. The regeneration zone 45 is so arranged that the catalyst does not circulate in the whole zone, that is the catalyst does not directly contact the actual walls of the regeneration zone: this arrangement consists of circulating the catalyst either through a cylinder, represented in cross-section (46 and 47) on the figure, arranged parallel to the walls of the regenerator, or through a system equivalent to this cylinder. For example, the regeneration zone is a substantially vertical elongate chamber whose horizontal cross-section is a curvilinear figure (circle or ellipse) and whose bottom has a spherical or ellipsoidal shape; the elongate chamber comprises an enclosure, for example a cylindrical enclosure, destined to receive a fixed or moving bed of catalyst, arranged substantially vertically in the elongate enclosure; the apparatus is so characterized that said enclosure, or at least the internal walls thereof, i.e. the walls contacted by the catalyst, are made of a material resistant, when hot, to chlorine, hydrochloric acid or any other chlorine compound, the remainder of the regeneration zone being made of a material having a lower resistance to chlorine, hydrochloric acid or any other chlorine compound.

Thus, in the most frequent case of a regeneration zone of cylindrical shape, the catalyst is circulated, according to the invention, inside a second cylinder arranged in the interior of the cylindrical regeneration zone. According to the invention, the second cylinder (plates such as 46 and 47 of the figure) is made of inconel or inconel is plated on the internal face in contact with the catalyst. The remainder of the apparatus, and particularly the actual walls of the regenerator being made of a conventional material, which may be chlorine-sensitive. Thus, according to the invention, the periodical flow of chlorine or chlorine compound injected in the interior of the plates such as 46 and 47, cannot erode metal particles by corrosion from the internal walls of plates such as 46 and 47, since these walls are made of inconel. This ensures that the catalyst circulated between these plates cannot be fouled with metal particles.

In practice, when injecting chlorine or a chlorine compound, such as hydrochloric acid, into the regenerator, a portion of this chlorine always flows behind the plates, such as 46 and 47, i.e. between these plates and the internal walls of the regenerator. It is thus preferred to have the regenerator made of a material such as chromium steel or stainless steel, instead of the too expensive inconel, and this is quite sufficient for resistance over long periods to the periodical injection of chlorine or hydrochloric acid.

It is clear that, after a long period, metal particles will be eroded behind plates 46 and 47, between these plates and the regenerator wall; however these metal particles do not contact the catalyst which is circulated on the other side of plates 46 and 47 and thus cannot foul the catalyst. The eroded metal particles are carried along with the gas stream in duct 78, and they will not disturb the regeneration process since they will be eliminated during the washing step of the invention, effected in the wash enclosure 61. If that enclosure did not exist, the catalyst would be contaminated by the metal particles resulting from the corrosion of the regeneration device behind plates 46 and 47, and this adds to the important corrosion by chlorine in the cold ducts of the recycle circuit for the gas streams discharged through duct 78 and recycle through duct 49.

What we claim is:

1. A process for regenerating a catalyst which is continuously withdrawn from a moving bed hydrocarbon hydroconversion process, said catalyst containing (a) carrier, (b) 0.1 to 10% by weight of elemental chlorine with respect to the catalyst, and (c) 0.005 to 5% of at least one noble metal of the platinum family, in which the spent catalyst is conducted to a separate regeneration zone and subjected therein at least to (a) combustion with a modecular oxygen-containing gas, (b) a chlorination or oxychlorination effected with chlorine or a chlorine compound or a mixture of chlorine and a chlorine compound, and (c) a treatment with a gas of high molecular oxygen content; wherein the various gases discharged from the catalyst regeneration zone are treated and then recycled for re-use in the catalyst regeneration zone, by a treatment comprising the steps of (a) cooling the discharged gases to a temperature lower than 70° C., (b) charging the cooled gases to a wash enclosure consisting of two serially arranged wash zones, washing the gases in the first wash zone with an aqueous solution containing, by weight with respect to water, 1 to 10% of sodium or potassium hydroxide or of an equivalent inorganic compound, and then washing the alkali-washed gases with substantially pure water in the second wash zone, (c) supplying the twice-washed gases to a drying zone, and drying the gases to a water content of lower than 2,500 ppm, and (d) heating and recycling the resultant dried gases to the catalyst regeneration zone;

wherein, in the catalyst regeneration zone, the catalyst is arranged as a fixed or moving bed, inside an enclosure internal to said regeneration zone, where those walls of the enclosure in contact with the catalyst are made of or coated with a material resistant, when hot, to chlorine or hydrochloric acid or any other chlorine compound, and wherein substantially the remaining internal walls of the regeneration zone are made of a material of lower resistance to chlorine, hydrochloric acid or any other chlorine compound than the material of said internal walls of the enclosure in contact with the catalyst.

2. A process according to claim 1, wherein the aqueous solution in the first wash zone further comprises 0.01 to 0.45% by weight of at least one thiosulfate.

3. A process according to claim 1, wherein the catalyst carrier is alumina.

4. A process according to claim 3, wherein the cooled gases are washed in said first wash zone by means of an aqueous solution comprising, by weight of water, 2.5 to 6% of sodium or potassium hydroxide or of an equivalent inorganic compound.

5. A process according to claim 4, wherein said aqueous solution contains 4 to 5% by weight of sodium or potassium hydroxide or of an equivalent inorganic compound, and 0.05 to 0.3% by weight of one or more thiosulfates, 0.3% being the maximum thiosulfate content.

6. A process according to claim 4, wherein metal particles which have been eroded by corrosion due to the action of chlorine or hydrochloric acid or any other chlorine compound, from said material of lower resistance to chlorine, hydrochloric acid or any other chlorine compound than the material of said internal walls of the enclosure in contact with the catalyst, are discharged from the regeneration zone, together with the gas outflow from the regeneration zone and are eliminated by washing in said wash enclosure.

7. A process according to claim 4, as applied to the regeneration of reforming catalysts.

8. A process according to claim 6, as applied to the regeneration of reforming catalysts.

9. A process according to claim 4, as applied to the regeneration of aromizing or aromatization catalysts.

10. A process according to claim 6, as applied to the regeneration of aromizing or aromatization catalysts.

11. The process of claim 1, wherein the catalyst is arranged as a fixed bed in the regeneration zone.

* * * * *